(12) United States Patent  
Schaefer et al.

(10) Patent No.: US 11,578,967 B2  
(45) Date of Patent: Feb. 14, 2023

(54) WAFER INSPECTION SYSTEM INCLUDING A LASER TRIANGULATION SENSOR

(71) Applicant: Rudolph Technologies, Inc., Wilmington, MA (US)

(72) Inventors: John Schaefer, Miller Place, NY (US); Christopher Voges, Eden Prairie, MN (US); Nicholas Smith, Burnsville, MN (US); Jeffrey Treptau, Lakeville, MN (US)

(73) Assignee: ONTO INNOVATION INC., Wilmington, MA (US)

( * ) Notice: Subject to any disclaimer, the term of this patent is extended or adjusted under 35 U.S.C. 154(b) by 0 days.

(21) Appl. No.: 16/620,317

(22) PCT Filed: Jun. 8, 2018

(86) PCT No.: PCT/US2018/036573  
§ 371 (c)(1),  
(2) Date: Dec. 6, 2019

(87) PCT Pub. No.: WO2018/227031  
PCT Pub. Date: Dec. 13, 2018

(65) Prior Publication Data  
US 2020/0191557 A1  Jun. 18, 2020

Related U.S. Application Data

(60) Provisional application No. 62/516,701, filed on Jun. 8, 2017.

(51) Int. Cl.  
*H04N 5/225* (2006.01)  
*G01B 11/06* (2006.01)  
(Continued)

(52) U.S. Cl.  
CPC ...... *G01B 11/0608* (2013.01); *G01B 11/2545* (2013.01); *G06T 7/0004* (2013.01);  
(Continued)

(58) Field of Classification Search  
CPC .. H04N 5/378; H04N 5/23245; H04N 5/2256; H04N 13/271; H04N 2213/003  
See application file for complete search history.

(56) References Cited

U.S. PATENT DOCUMENTS 5,999,266 A  12/1999  Takahashi et al.  
6,164,118 A  12/2000  Suzuki et al.  
(Continued)

FOREIGN PATENT DOCUMENTS

CN  104197837 A  12/2014  
JP  2000074845 A  3/2000  
(Continued)

OTHER PUBLICATIONS

IPOS Written Opinion Report for 11201911246X, dated Oct. 22, 2020, 5 pages.  
(Continued)

*Primary Examiner* — Samira Monshi  
(74) *Attorney, Agent, or Firm* — Dicke, Billig & Czaja, PLLC

(57) ABSTRACT

One example of an inspection system includes a laser, a magnification changer, and a first camera. The laser projects a line onto a wafer to be inspected. The magnification changer includes a plurality of selectable lenses of different magnification. The first camera images the line projected onto the wafer and outputs three-dimensional line data indicating the height of features of the wafer. Each lens of the magnification changer provides the same nominal focal plane position of the first camera with respect to the wafer.

15 Claims, 7 Drawing Sheets

(51) Int. Cl.
  *G06T 7/00* (2017.01)
  *G01B 11/25* (2006.01)
  *H04N 5/232* (2006.01)
  *H04N 5/247* (2006.01)
  *G01N 21/95* (2006.01)

(52) U.S. Cl.
  CPC ............ *G06T 7/97* (2017.01); *H04N 5/2256* (2013.01); *H04N 5/23296* (2013.01); *H04N 5/247* (2013.01); *G01B 2210/56* (2013.01); *G01N 21/9501* (2013.01); *G06T 2207/30148* (2013.01)

(56) References Cited

U.S. PATENT DOCUMENTS

| | | | |
|---|---|---|---|
| 6,501,554 | B1 | 12/2002 | Hackney et al. |
| 2003/0001117 | A1* | 1/2003 | Hyun ................. G01B 11/00 250/559.19 |
| 2006/0262295 | A1 | 11/2006 | Backhauss et al. |
| 2007/0148792 | A1 | 6/2007 | Marx et al. |
| 2007/0206204 | A1 | 9/2007 | Jia et al. |
| 2009/0123060 | A1 | 5/2009 | Liu et al. |
| 2010/0177951 | A1 | 7/2010 | Vodanovic |
| 2010/0188486 | A1 | 7/2010 | Amanullah et al. |
| 2010/0189339 | A1 | 7/2010 | Amanullah et al. |
| 2011/0093274 | A1* | 4/2011 | Lee ....................... G10L 21/06 704/276 |
| 2012/0087569 | A1 | 4/2012 | O'Dell et al. |
| 2015/0228069 | A1 | 8/2015 | Fresquet et al. |
| 2015/0233840 | A1 | 8/2015 | Amanullah et al. |
| 2017/0003230 | A1 | 1/2017 | Park et al. |
| 2017/0082552 | A1* | 3/2017 | Kim ................. G01N 21/95623 |
| 2017/0254639 | A1* | 9/2017 | Wong ................. G01B 11/0608 |
| 2017/0276613 | A1 | 9/2017 | Liu et al. |

FOREIGN PATENT DOCUMENTS

| | | |
|---|---|---|
| JP | 2005337943 A | 12/2005 |
| JP | 2011134759 A | 7/2011 |
| JP | 2012078302 A | 4/2012 |
| KR | 10-2012-0087680 A | 8/2012 |
| KR | 20140089846 A | 7/2014 |
| TW | 201100779 A | 1/2011 |
| TW | 201544788 A | 12/2015 |
| TW | 201801217 A | 1/2018 |
| TW | 201802434 A | 1/2018 |
| WO | 2017162456 A1 | 9/2017 |

OTHER PUBLICATIONS

Supplementary European Search Report for related Application No. 18814215, dated Feb. 5, 2021 (7 pages).
PCT International Preliminary Report on Patentability for PCT/US2018/059404, dated May 12, 2020, 6 pages.
English Translation of TW Search Report for Patent application No. 107119848 dated Dec. 17, 2021, 7 pages.
Non Final Office Action for U.S. Appl. No. 16/762,011, dated Jun. 22, 2022, 31 pages.

* cited by examiner

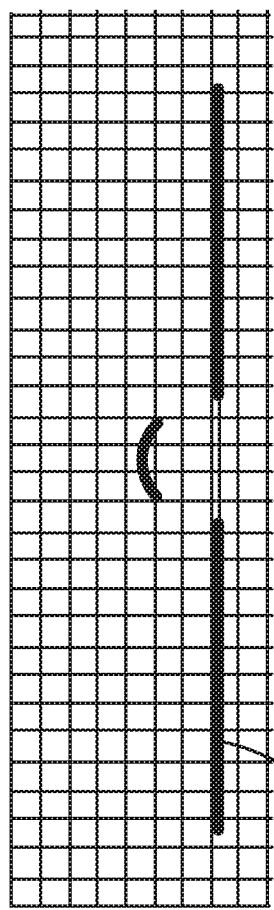
Fig. 7A
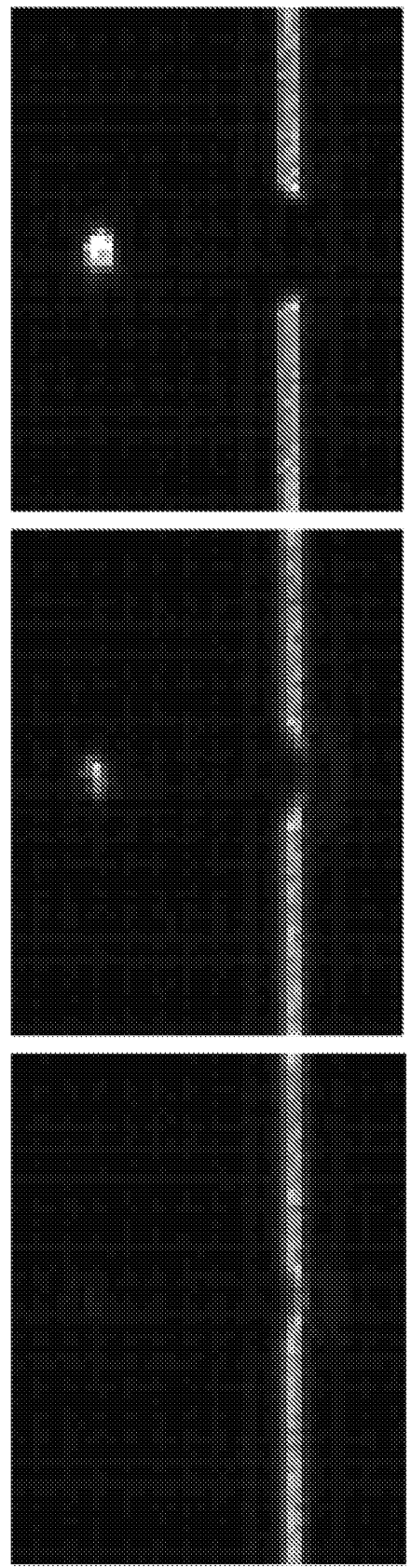
Fig. 7D
Fig. 7C
Fig. 7B

11,578,967 B2

WAFER INSPECTION SYSTEM INCLUDING A LASER TRIANGULATION SENSOR

CROSS REFERENCE TO RELATED APPLICATIONS

This application is a PCT Application that claims priority to U.S. Provisional Patent Application No. 62/516,701, filed Jun. 8, 2017, entitled "WAFER INSPECTION SYSTEM INCLUDING A LASER TRIANGULATION SENSOR" and is incorporated herein by reference.

BACKGROUND

Semiconductor wafers may be inspected using inspection systems to measure features of the wafer for quality control. It is advantageous to increase throughput, improve accuracy, increase dynamic range, improve reliability, and reduce the cost of inspection systems.

BRIEF DESCRIPTION OF THE DRAWINGS

FIGS. 7A-7D illustrates the laser line as viewed by the camera and sample frames obtained by the camera.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Disclosed herein is a system and method of laser triangulation for wafer inspection. A laser line generator may project a line onto the surface of a wafer. The laser line may be imaged onto a three-dimensional (3D) camera by microscope optics. The 3D camera may acquire two-dimensional (2D) images of the laser line, convert the 2D images into 3D lines in a field programmable gate array (FPGA) processing board, and output the 3D lines to a frontside computer via a universal serial bus (USB) (e.g., USB3.0) interface.

Figure 1:
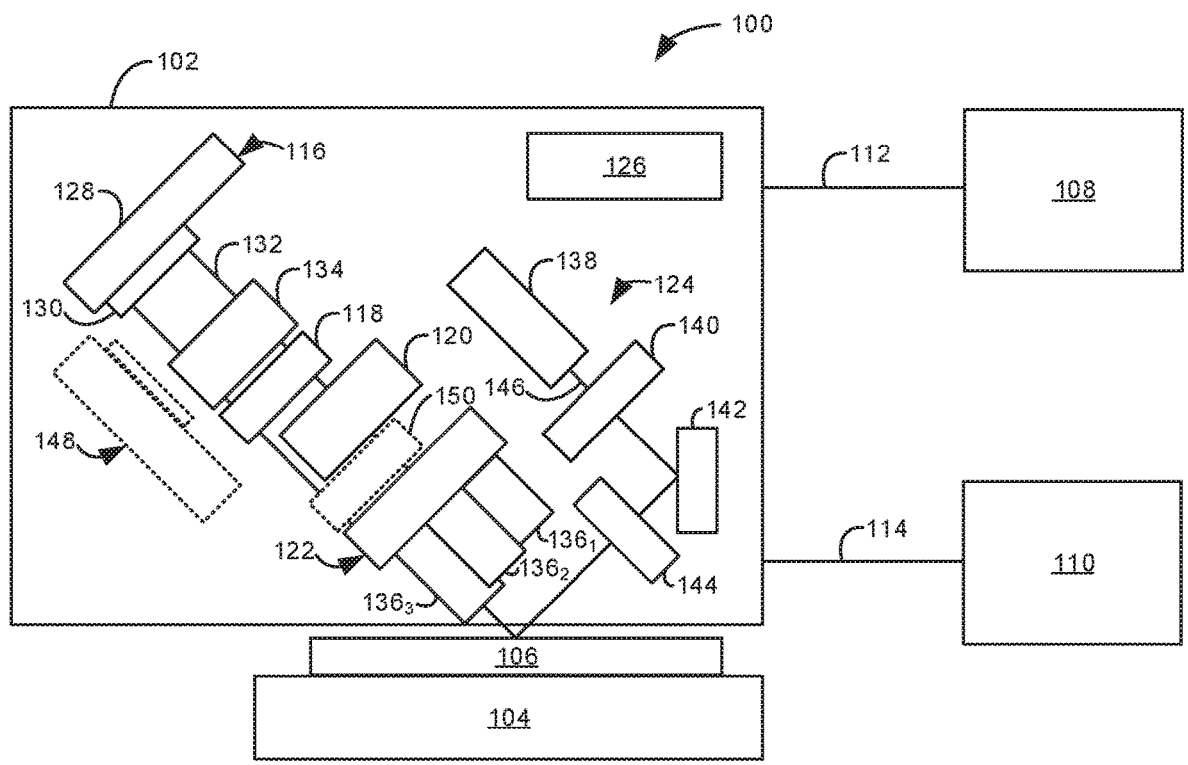
FIG. 1 is a block diagram illustrating one example of an inspection system including a laser triangulation sensor.

FIG. 1 is a block diagram illustrating one example of an inspection system 100 including a laser triangulation sensor. The inspection system 100 may include a sensor head 102, a stage 104 to support a wafer 106 to be inspected, a trigger board 108, and a frontside computer 110. The trigger board 108 may be communicatively coupled to the sensor head 102 via a trigger/encoder signal path 112. The frontside computer 110 may be communicatively coupled to the sensor head 102 via a USB (e.g., USB3.0) interface 114.

The sensor head 102 may include a first 3D camera 116, an isolator 118, a specular filter/blocker 120, a magnification changer (e.g., turret/slide) 122, a laser mount 124, and an interface/control board 126. The first 3D camera 116 may include a first camera enclosure 128, a mount 130, a tube 132, and a lens 134. The magnification changer 122 may include a plurality of objective lenses $136_1$ to $136_3$ of different magnification (e.g., 2x, 10x, and 5x). The magnification changer 122 may provide the same nominal focal plane position of the first camera 116 with respect to the wafer 106 for each of the objective lenses $136_1$ to $136_3$ by shimming the objective lenses.

The laser mount 124 may include a laser 138, an attenuator 140, a mirror 142, and a quarter wave plate 144. The laser 138 may generate a laser line 146, which may be attenuated by the attenuator 140, reflected by the mirror 142 and passed through the quarter wave plate 144 for projection onto the wafer 106. The attenuator 140, mirror 142, and quarter wave plate 144 between the laser 138 and the wafer 106 may provide a circularly polarized laser line on the surface of the wafer 106 at an angle of 45 degrees to the wafer normal. The laser mount 124 may allow for the following adjustments: translation in Z to get the focal point on the objective lens center axis, rotation about Z to get the line parallel to the tool Y axis, rotation about X to get the line center on the objective lens center axis or to flatten the field of the laser, and rotation about Y to get the plane on the objective lens nominal working distance.

The quarter wave plate 144 may convert the naturally linear polarized light out of the laser 138 to circularly polarized light. The attenuator 140 may be a neutral density type fixed attenuator to achieve a slight reduction in laser power. The mirror 142 may be a turning mirror to redirect the laser beam 146 to the wafer 106. The mirror 142 may include a rotation about Y adjustment to get the plane passing through the nominal tool point. Rotation about Z may also be used to get the line center on the objective lens center axis or to flatten the field of the laser 138. The laser line 146 projected onto the surface of the wafer 106 is reflected back toward the first camera 116 through the magnification changer 122, the specular filter/blocker 120, the isolator 118, and the camera lens 134.

Figure 2:
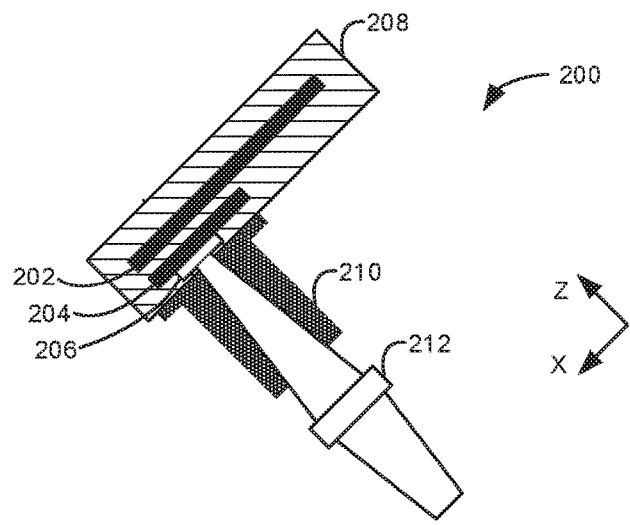
FIG. 2 illustrates one example of a camera for the laser triangulation sensor.

FIG. 2 illustrates one example of a camera 200. In one example, the camera 200 may be used for camera 116 of FIG. 1. The camera 200 may include 3D camera boards 202 and 204, an image sensor 206, a camera enclosure 208, a camera mount/tube 210, and a camera lens 212. The image sensor 206 may be a mono complementary metal-oxide-semiconductor (CMOS) sensor with an electronic shutter. The camera 200 may include an image processing mode that is configurable for 3D or 2D. The maximum frame rate for 3D mode may be 57,000 fps or more for a 1280×50 window size, 29,500 fps or more for a 1280×100 window size, or 3,500 fps or more for a 1280×864 window size. The maximum frame rate for 2D mode may be the lesser of the 3D mode rate listed above and (200 MB/s/(frame size)). X windowing may be size configurable from 1 to 1280. The start position may be configurable from 0-1279. The frame rate should increase inverse proportional to size between 1280 and 1184. Size below 1184 may be achieved by data skip with no frame rate benefit. Y windowing may be size configurable in quanta of 4. The start position may be configurable from 0 to 860. The frame rate should change inverse proportional to size. The output format of the camera 200 in 3D mode may be 32-bit (16-bit Z and 16-bit Intensity); and the output format in 2D mode may be configurable for 8-bit (stored as 8-bit) or 10-bit (stored as 16-bit).

The camera 200 may be mounted with the long dimension of the image sensor 206 parallel to the Y axis. The camera 200 may be mounted in such a way that a splitter and second camera 148 (FIG. 1) may be used if desired. The enclosure 208 and mount 210 may provide the following adjustments: mount translation in X (e.g., adjustable with gauge blocks), mount translation in Z/Focus (e.g., adjustable with gauge blocks), and mount rotation about Z. These adjustments may primarily be used to compensate for image sensor position/rotation errors with respect to the enclosure 208, however, they may also be used to remove residual errors after laser line position adjustment.

The receiver section of the camera mount 210 may enable reconfiguration for camera lenses with focal lengths in the range of 148 mm to 295 mm. Referring back to FIG. 1, the isolator 118 may work in conjunction with the quarter wave plate 144 to block laser light from double bounces between two bumps or between the wafer 106 surface and a bump. The isolator 118 may consist of a preassembled quarter wave plate and linear polarizer. The isolator 118 may be mounted between the camera lens 134 and objective lens $136_1$ to $136_3$ with the linear polarizer facing the camera lens.

An automated specular filter/blocker 120 may be used when inspecting diffuse reflective surfaces such as prereflow bumps at low magnification. The specular filter/blocker 120 may be located close to the objective lens aperture. The specular filter/blocker 120 may include a plurality of selectable filters and/or blockers. The specular filter/blocker 120 may include a wheel with flag/phase positioning. Low moment of inertia (MOI) and friction may allow for a small power stepper motor to position blockers or filters quickly and accurately. The multiple blockers may have different sizes and may have different shapes depending on what spatial blocking would provide the cleanest signal (similar to micro inspection or scattering tools that block all light not related to the signals that are of interest). A filter may include a Fourier filter. Liquid crystal display (LCD) as well as solid blocking material (e.g., Vantablack) may be used. The specular filter/blocker 120 may be controlled automatically using recipes and may include a means to detect which position the filter/blocker is in and/or to detect if the filter/blocker is not fully in one of the positions.

A cylindrical lens 150 or receiver defocus may be used. In other examples, cylindrical lens 150 is not used. As the radius of the top of a mirror like spherical bump becomes small compared to the laser line width, the data can exhibit a stair step effect. This effect is at its worst when the spherical surface spreads the light far beyond the objective lens numerical aperture (NA) causing a diffraction limited line to be formed on the image sensor. When the line width is less than one pixel, the stair step effect is easily visible. The centroid error as a function of laser image size for a Gaussian shape should be kept a factor of two below the $1/16^{th}$ subpixel resolution, which comes to 3% of a pixel. Accordingly, the image width should be at least 1.5 pixels or larger to keep the centroid error below 3%. A weak cylindrical lens that increases the camera lens focal length (FL) in the X direction may be used to accomplish this. The camera may also be moved closer to the camera lens to accomplish this, however, this also defocuses Y which may be desirable or undesirable depending on the amount of defocusing and the feature being inspected. The camera focus adjustment may have additional travel in the negative Z direction to accommodate defocusing to increase the objective lens NA diffraction limited spot size to at least three pixels.

The magnification changer 122 of the sensor head 102 may automatically switch between two or three objective lenses $136_1$ to $136_3$ via recipe control. The magnification changer 122 does not cause the distance between the 2D and laser triangulation optical center lines to increase. The magnification changer 122 may include a means to detect which lens positon the magnification changer is in. If the magnification changer 122 is not fully in a lens positon, then the magnification changer does not report as being in any positon.

The magnification changer 122 may support multiple interchangeable objective lenses of the same family. For example, the objective lenses may include any suitable combination of the following: 2x, 3x, 5x, 7.5x, 10x, or 20x lenses. The objective lenses may be manually swapped in the field with only configuration file changes and recalibration. Optical adjustments should not be required. If the parfocal distance varies too much between objectives, then custom spacers may be used to adjust the distance. In this case, a master 10x objective with nominal spacer may be used in manufacturing so that all production 2x, 3x, 5x, and 10x objectives may be spaced to the ideal parfocal distance.

Figure 3:
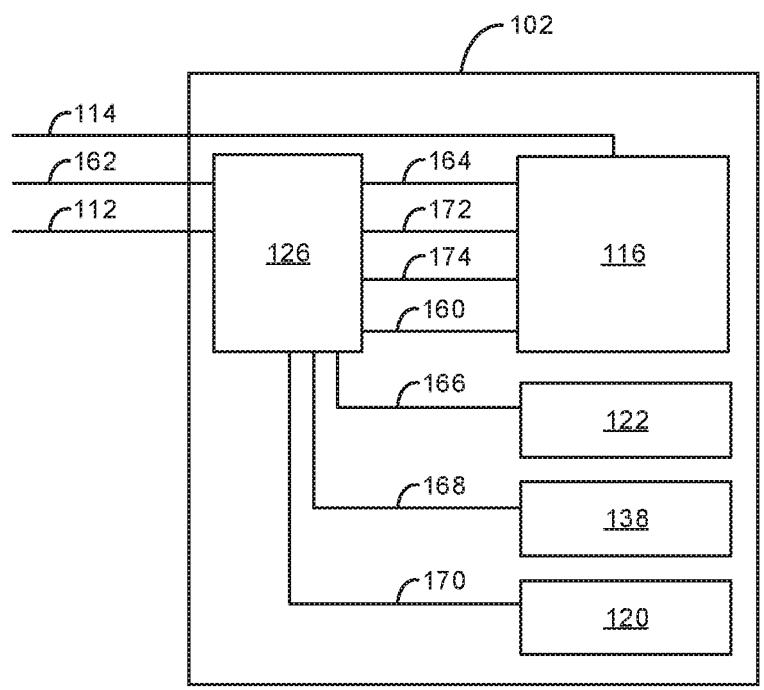
FIG. 3 is a block diagram illustrating one example of interface/control board connections for the laser triangulation sensor.

FIG. 3 is a block diagram illustrating one example of interface/control board 126 connections for the laser triangulation sensor. The electro-mechanical devices in the sensor head 102 may be controlled by the interface/control board 126 located in the sensor head. Communications from the frontside computer 110 (FIG. 1) to the interface/control board 126 may be through the 3D camera 116 via the USB interface 114 and serial peripheral interface (SPI) interfaces 160. This approach may minimize the number of cables and centralize the control functions, which may reduce cost and improve reliability and serviceability.

The interface/control board 126 may include a micro controller chip (MCU) with SPI, general purpose input/output (GPIO), analog to digital converters (ADCs), and digital to analog converters (DACs). The interface/control board 126 may support at least one laser (e.g., laser 138) and two 3D cameras (e.g., 3D cameras 116 and 148). The interface/control board 126 may distribute power from power path 162 to power path 164 to the 3D camera(s) 116 and/or 148, laser(s) 138 and other devices as necessary. The interface/control board 126 may control the magnification changer 122 (e.g., turret/slide) through a communication path 166, the specular filter/blocker 120 through a communication path 170, and the on/off and output power of the laser(s) 138 through a communication path 168.

The interface/control board 126 may receive the RS422 trigger and encoder signals through signal path 112 and convert them to single ended TTL signals for the 3D camera(s). The interface/control board 126 may output the trigger signals to the 3D camera(s) through a signal path 172 and output the encoder signals to the 3D camera(s) through a signal path 174. In one example where two 3D cameras are used, one camera may receive odd numbered triggers and the other camera may receive even numbered triggers.

The interface/control board 126 may support trigger buffering logic, which queues up triggers when the triggers are coming in too fast during acceleration overshoot and velocity ripple peaks and then catches up during velocity ripple valleys. The maximum queue depth may be configured. With the XY stage, trigger buffering may allow velocity safety margins as small a 0.3% to be used while falling behind by no more than 1 trigger. The trigger buffering logic may use the trigger output signal from the camera through signal path 172 to decide when the next trigger can be sent. In other examples, the trigger buffering logic may be implemented by trigger board 108 or by 3D camera 116.

Figure 4:
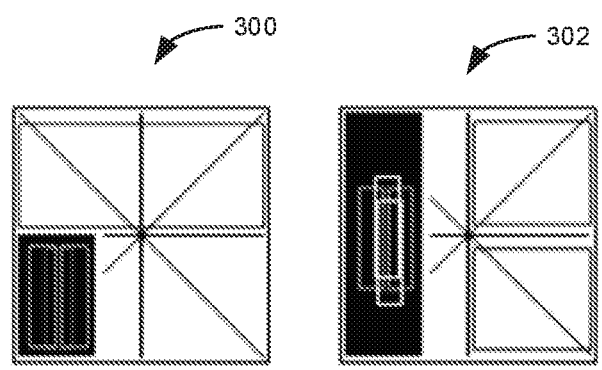
FIG. 4 illustrates example calibration blocks for calibrating the laser triangulation sensor.

FIG. 4 illustrates example calibration blocks 300 and 302 for calibrating the laser triangulation sensor. A rectangle may be used for Z calibration, laser power calibration, Z origin calibration, and to determine the normal vector of the calibration block to compensate calibration in the event the calibration block was not perfectly level. A rectangle may also be used for Z vs. Y flatness checks, Z noise level checks, and scan pass to scan pass Z vs. Y uniformity checks. The rectangle boundaries may be used for checking stray light and bright to dark or dark to bright transition response.

A star pattern may be used for Y calibration and XY origin calibration. A star pattern may also be used for profiling the laser throughout the entire Y field of view (FOV) and Z FOV and for checking and/or adjusting the calibration block slope and rotation. In one example, the rectangle and star features accommodate a 2 mm Z FOV and an 8 mm Y FOV.

Figure 5A:
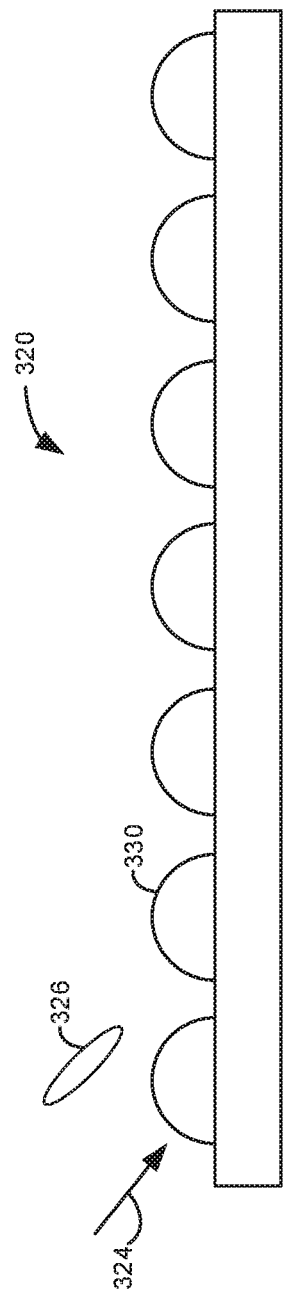
FIGS. 5A and 5B illustrate one example of a wafer being inspected using the laser triangulation sensor.
Figure 5B:
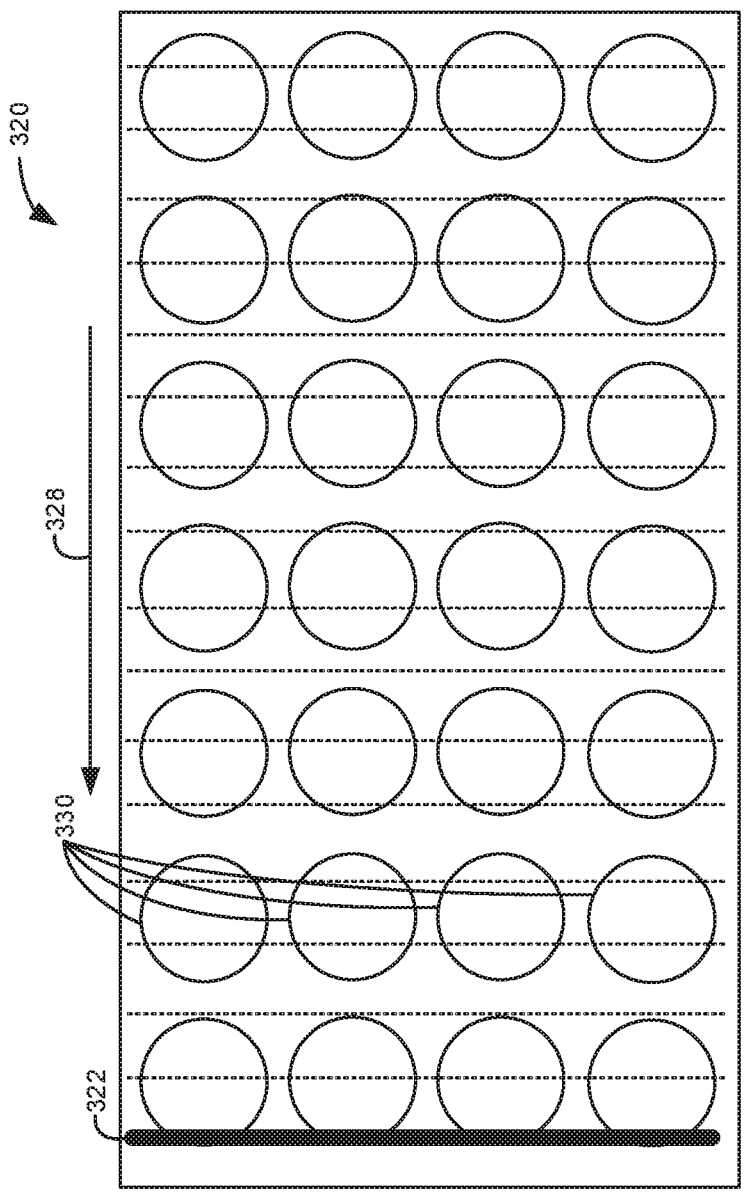

FIGS. 5A and 5B illustrate one example of a wafer 320 being inspected. FIG. 5A illustrates a side view of wafer 320, and FIG. 5B illustrates a top view of wafer 320. In one example, the laser line 322 is projected onto the wafer 320 at 45 degrees as indicated by arrow 324 and the reflection of the laser line 322 is imaged by the camera as indicated at 326. The wafer 320 is moved via the stage in the direction indicated by arrow 328 for each image as indicated for example by the dashed lines. Multiple features (e.g., bumps) 330 may be measured simultaneously.

Figure 6:
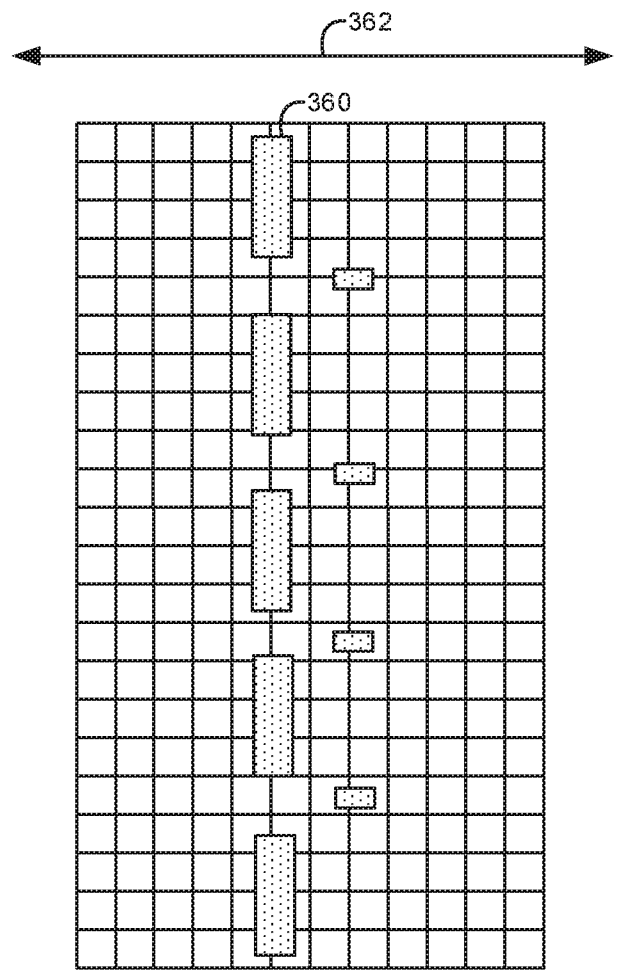
FIG. 6 illustrates one example of a laser line viewed by the camera of the laser triangulation sensor.

FIG. 6 illustrates one example of a laser line 360 viewed by the camera. The position of the line in the direction indicated at 362 sensed by the camera indicates the height of the features of the wafer. An entire line of data is detected at once.

FIG. 7A illustrates one example of a laser line 370 as viewed by the camera and FIGS. 7B-7D illustrate sample frames obtained by the camera. The camera allows unwanted data to be filtered from bump top centroid calculation, which improves accuracy.

Figure 8:
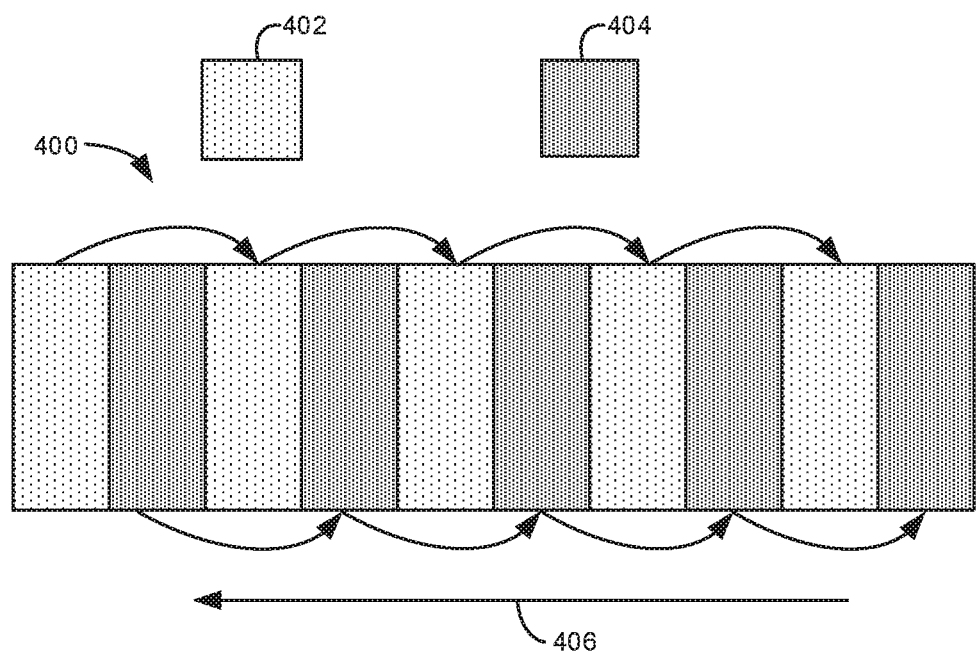
FIG. 8 illustrates one example of using two cameras to inspect a wafer.

FIG. 8 illustrates one example of using two cameras to inspect a wafer 400. Two cameras may be used to increase the speed of inspection. In one example, the first camera (indicated by pattern 402) and the second camera (indicated by pattern 404) are coupled to the optical path by a beam splitter such that the two cameras of the inspection system substantially share the same field of view. The stage upon which a wafer is supported may be moved in the direction indicated by arrow 406 at a rate relative to the field of view of the cameras such that each camera, when operated alternately, captures successive fields of view (i.e., interleaving) that cover substantially the entire surface of the wafer that is to be imaged. The velocity of the stage may be correlated to the rate at which the two cameras capture images of the field of view and the size of the field of view of the cameras.

Figure 9:
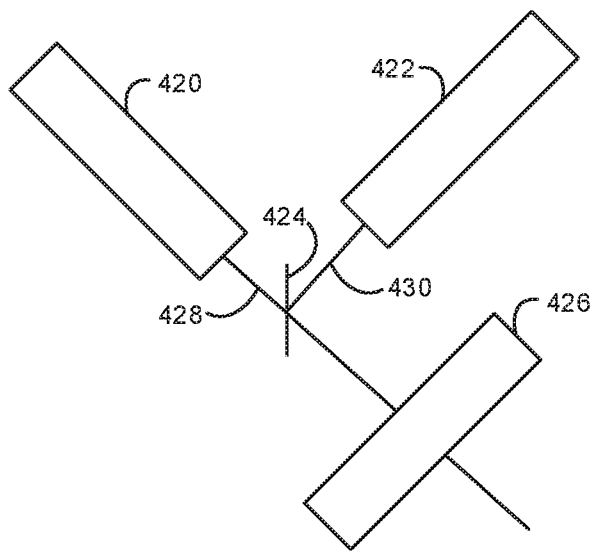
FIG. 9 illustrates one example of using two lasers to inspect a wafer.

FIG. 9 illustrates one example of using two lasers to inspect a wafer. This example includes a first laser 420, a second laser 422, a mirror 424, and an attenuator 426. The first laser 420 generates a laser line 428, which passes through mirror 424 and is attenuated by the attenuator 426. The second laser 422 generates a laser line 430, which is reflected by mirror 424 and is attenuated by the attenuator 426. A second camera capable of capturing images in a range of wavelengths to which the wafer is at least partially transparent may be used with the second laser 422 that emits light in the range of wavelengths viewable by the second camera. In this case, the second laser 422 emits light in the range of wavelengths to which the wafer is at least partially transparent.

Figure 10:
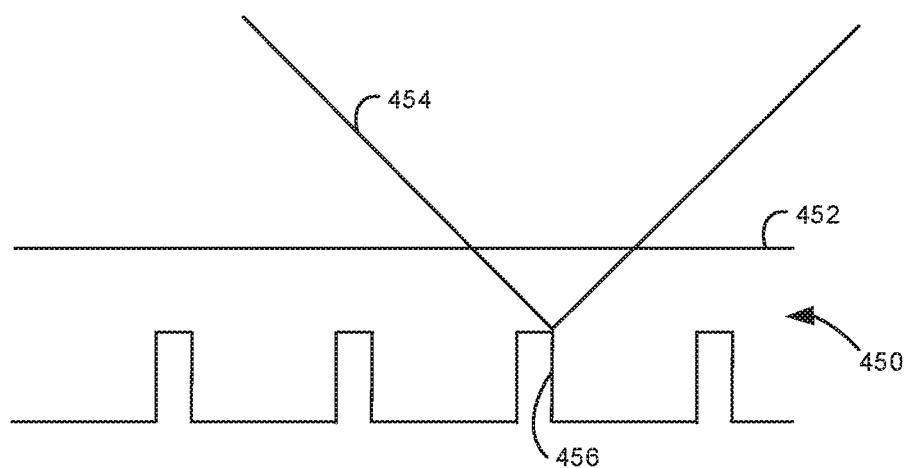
FIG. 10 illustrates one example of inspecting a wafer from the reverse side of the wafer.

FIG. 10 illustrates one example of inspecting a wafer 450 from the reverse side 452 of the wafer. A laser line 454 may be projected by a second laser onto one or more features 456 through the reverse side 452 of the wafer 450. In this case, the second camera captures an image of the projected line from the second laser and outputs three-dimensional line data indicating the height of features of the wafer. The features may be selected from a group consisting of vias and trenches.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An inspection system comprising:
a laser to project a line onto a wafer to be inspected;
a magnification changer including a plurality of selectable lenses of different magnification;
a first camera to image the line projected onto the wafer, wherein the first camera is a three-dimensional camera configured to convert the imaged line into three-dimensional line data and output the three-dimensional line data indicating the height of features of the wafer;
wherein each lens of the magnification changer provides the same nominal focal plane position of the first camera with respect to the wafer;
a second camera;
wherein the first camera and the second camera are coupled to an optical path by a beam splitter such that the first camera and the second camera substantially share the same field of view; and
a stage upon which a wafer is supported, the stage to move at a rate relative to the field of view of the first camera and the second camera such that each of the first camera and the second camera, when operated alternately, capture successive fields of view that cover substantially the entire surface of the wafer.

2. The inspection system of claim 1, further comprising:
a specular filter/blocker between the magnification changer and the first camera, the specular filter/blocker including a plurality of selectable filters and/or blockers.

3. The inspection system of claim 1, further comprising:
an attenuator, a mirror, and a quarter wave plate between the laser and the wafer to provide a circularly polarized laser line on the surface of the wafer at an angle of 45 degrees to the wafer normal.

4. The inspection system of claim 1, further comprising:
an isolator between the first camera and the magnification changer.

5. The inspection system of claim 1, further comprising:
a cylindrical lens between the magnification changer and the first camera.

6. The inspection system of claim 1, wherein the second camera is configured to image a line projected onto the wafer and output three-dimensional line data indicating the height of features of the wafer.

7. The inspection system of claim 1, wherein a velocity of the stage is correlated to the rate at which the first camera and the second camera capture images of the field of view and the size of the field of view of the first camera and the second camera.

8. The inspection system of claim 1, further comprising:
trigger buffering logic to queue up triggers for the first camera in response to triggers coming in too fast during acceleration overshoot and velocity ripple peaks and then catch up during velocity ripple valleys.

9. An inspection system comprising:
light emitting means for projecting a laser line onto a wafer to be inspected;
imaging and converting means for imaging the line projected onto the wafer, for converting the imaged line into three-dimensional line data, and for outputting the three-dimensional line data indicating the height of features of the wafer, wherein the imaging means comprises:
  a first camera provided as a three-dimensional camera, and
  a second camera,
  wherein the first camera and the second camera are coupled to an optical path by a beam splitter such that the first camera and the second camera substantially share the same field of view;
magnification changing means optically between the wafer to be inspecting and the imaging means, the magnification changing means including a plurality of selectable lenses of different magnification;
wherein each lens of the magnification changing means provides the same nominal focal plane position of the imaging means with respect to the wafer; and
support means upon which a wafer is supported, the support means including a stage to move at a rate relative to the field of view of the first camera and the second camera such that each of the first camera and second camera, when operated alternately, capture successive fields of view that cover substantially the entire surface of the wafer.

10. The inspection system of claim 9, further comprising:
isolator means between the imaging and converting means and the magnification changing means.

11. The inspection system of wherein a velocity of the stage is correlated to the rate at which the first camera and the second camera capture images of the field of view and the size of the field of view of the first camera and the second camera.

12. An inspection system comprising:
a laser to project a line onto a wafer to be inspected;
a magnification changer including a plurality of selectable lenses of different magnification;
a first camera to image the line projected onto the wafer, wherein the first camera is a three-dimensional camera configured to convert the imaged line into three-dimensional line data and output the three-dimensional line data indicating the height of features of the wafer;
wherein each lens of the magnification changer provides the same nominal focal plane position of the first camera with respect to the wafer;
a second camera to capture images in a range of wavelengths to which the wafer is at least partially transparent; and
a second laser that emits light in the range of wavelengths viewable by the second camera, which is again the range of wavelengths to which the wafer is at least partially transparent.

13. The inspection system of claim 12, wherein a line is projected by the second laser onto one or more features through the reverse side of the wafer, and further wherein the second camera captures an image of the projected line from the second laser and outputs three-dimensional line data indicating the height of features of the wafer.

14. The inspection system of claim 12, wherein the features are selected from a group consisting of vias and trenches.

15. An inspection system comprising:
a laser to project a line onto a wafer to be inspected;
a magnification changer including a plurality of selectable lenses of different magnification;
a first camera to image the line projected onto the wafer, wherein the first camera is a three-dimensional camera configured to convert the imaged line data into three-dimensional line data and output the three-dimensional line data indicating the height of features of the wafer;
wherein each lens of the magnification changer provides the same nominal focal plane position of the first camera with respect to the wafer; and
at least one assembly selected from the group consisting of:
  a specular filter/blocker between the magnification changer and the first camera, the specular filter/blocker including a plurality of selectable filters and/or blockers,
  an attenuator, a mirror, and a quarter wave plate between the laser and the wafer to provide a circularly polarized laser line on the surface of the wafer at an angle of 45 degrees to the wafer normal,
  an isolator between the first camera and the magnification changer, and
  a cylindrical lens between the magnification changer and the first camera.

* * * * *